US 8,919,150 B2

(12) United States Patent
Imai et al.

(10) Patent No.: US 8,919,150 B2
(45) Date of Patent: Dec. 30, 2014

(54) METHOD OF MANUFACTURING AN ION-EXCHANGED GLASS ARTICLE

(75) Inventors: Mitsugu Imai, Tokyo (JP); Kazuaki Hashimoto, Tokyo (JP); Osamu Sugihara, Tokyo (JP)

(73) Assignee: Hoya Corporation, Tokyo (JP)

( * ) Notice: Subject to any disclaimer, the term of this patent is extended or adjusted under 35 U.S.C. 154(b) by 66 days.

(21) Appl. No.: 13/608,659

(22) Filed: Sep. 10, 2012

(65) Prior Publication Data

US 2013/0061636 A1  Mar. 14, 2013

(30) Foreign Application Priority Data

Sep. 9, 2011  (JP) ................................ 2011-196784

(51) Int. Cl.
*C03C 21/00* (2006.01)
*G11B 5/84* (2006.01)
*C03C 3/083* (2006.01)
*G11B 5/71* (2006.01)

(52) U.S. Cl.
CPC ............ *G11B 5/8404* (2013.01); *C03C 21/002* (2013.01); *C03C 3/083* (2013.01)
USPC .......................... 65/30.14; 65/60.7; 428/846.9

(58) Field of Classification Search
CPC ...... C03C 21/00; C03C 21/002; C03C 3/087; C03C 3/091; C03C 17/00; C03C 21/008; C03C 3/083; C03C 3/085; C03C 3/093; C03C 3/097; G11B 5/7315; G11B 5/8404
USPC ................. 501/70, 63, 64, 65, 66, 67, 68, 69; 428/141, 156, 220, 337, 426, 846.9; 65/30.14, 60.51, 60.7
See application file for complete search history.

(56) References Cited

U.S. PATENT DOCUMENTS

| 3,791,809 | A | * | 2/1974 | Lau ............................... 65/30.14 |
| 4,015,045 | A | * | 3/1977 | Rinehart ....................... 65/30.14 |
| 4,021,218 | A | * | 5/1977 | Watanabe ..................... 65/30.14 |
| 4,042,405 | A | * | 8/1977 | Krohn et al. .................... 501/70 |
| 2005/0181218 | A1 | * | 8/2005 | Shiraishi et al. ................ 501/70 |
| 2005/0215414 | A1 | * | 9/2005 | Kawai ............................ 501/69 |
| 2005/0244656 | A1 | * | 11/2005 | Ikenishi et al. ................. 501/70 |
| 2009/0277222 | A1 | * | 11/2009 | Iwata et al. ................... 65/30.14 |
| 2010/0047521 | A1 | * | 2/2010 | Amin et al. ..................... 501/70 |
| 2011/0165380 | A1 | * | 7/2011 | Gahagan et al. .............. 428/220 |
| 2012/0107647 | A1 | * | 5/2012 | Matsumoto et al. ............ 501/70 |

FOREIGN PATENT DOCUMENTS

| GB | 1218093 A | 1/1971 |
| JP | 46-39117 B | 11/1971 |

* cited by examiner

*Primary Examiner* — Kevin M. Bernatz
*Assistant Examiner* — Louis Falasco
(74) *Attorney, Agent, or Firm* — Sughrue Mion, PLLC

(57) ABSTRACT

An ion-exchanged glass article manufacturing method includes an ion-exchange step of bringing a glass article with a composition containing Li into contact with a molten salt dissolved solution containing an alkali metal element having an ionic radius larger than an ionic radius of the Li contained in the glass article, thereby ion-exchanging the Li in the glass article with the alkali metal element in the molten salt dissolved solution. At least one kind of additive selected from the group consisting of NaF, KF, $K_3AlF_6$, $Na_2CO_3$, $NaHCO_3$, $K_2CO_3$, $KHCO_3$, $Na_2SO_4$, $K_2SO_4$, $KAl(SO_4)_2$, $Na_3PO_4$, and $K_3PO_4$ is added to the molten salt dissolved solution so that the ion-exchange step is carried out while the additive is in a solid state.

23 Claims, No Drawings

METHOD OF MANUFACTURING AN ION-EXCHANGED GLASS ARTICLE

This application is based upon and claims the benefit of priority from Japanese Patent Application No. 2011-196784, filed on Sep. 9, 2011, the disclosure of which is incorporated herein in its entirety by reference.

TECHNICAL FIELD

This invention relates to an ion-exchanged glass article manufacturing method suitable for a glass article that requires high strength, such as a glass substrate for a magnetic disk adapted to be mounted in a magnetic disk device like a hard disk drive (HDD), or a wiring or mounting board using a strengthened glass. Hereinafter, a glass substrate for a magnetic disk may also be referred to as a magnetic disk glass substrate. The ion-exchanged glass article manufacturing method is particularly suitable for the magnetic disk glass substrate.

BACKGROUND ART

In order to improve the strength of a glass article, physical strengthening or chemical strengthening is normally carried out. The chemical strengthening is a treatment in which the glass article is brought into contact with a molten chemical strengthening salt so that an alkali metal element having a relatively small ionic radius in the glass article is ion-exchanged with an alkali metal element having a relatively large ionic radius in the chemical strengthening salt, thereby generating compressive stress on surfaces of the glass article. For example, in the case where alkali metals such as Li, Na, and K are present in the glass article, by replacing the alkali metals in the glass article by alkali metals having larger ionic radii (Li in the glass article is replaced by Na and/or K having a larger ionic radius/radii and Na in the glass article is replaced by K having the larger ionic radius), it is possible to generate compressive stress in a glass surface layer, thereby improving the strength of the glass article and thus enhancing its impact resistance.

In the meantime, it has conventionally been known that while such chemical strengthening is carried out, there arises a problem that, for example, Li ions eluted from the glass article are accumulated in the molten salt and, as the Li-ion concentration in the molten salt gradually increases, the ion exchange is difficult to proceed.

Patent Document 1 (JP-B-S46-39117) discloses that when chemically strengthening a soda-lime glass using a mixed molten salt of $KNO_3$, $K_2SO_4$, and KCl, the concentration of $Na^+$ ions, eluted from the soda-lime glass, in the mixed molten salt can be kept low by adding special clay particles, rich in $K^+$ ions and known as hectorite, to the mixed molten salt. Other than the hectorite, Patent Document 1 shows, as a substance for regenerating the chemical strengthening solution, a clay or a clay mineral such as bentonite or montmorillonite, a silicate, a borate, a vitreous or non-vitreous aluminosilicate, a solid gel that can fix protons or alkali metal ions, and so on.

SUMMARY OF THE INVENTION

However, Patent Document 1 does not disclose a mechanism for regenerating the chemical strengthening solution and includes a mode which is insufficient in regeneration or cannot be used depending on the type of glass or molten salt to be used. Further, depending on the use of a glass article, there is also a problem that the glass article cannot satisfy properties other than strength required for its use and thus cannot be used.

In particular, as glass articles that are subjected to chemical strengthening in recent years, there are, for example, a glass substrate for a magnetic disk adapted to be mounted in a magnetic disk device such as HDD, a wiring or mounting board using a strengthened glass, and so on.

Among them, the magnetic disk glass substrate requires, in addition to high strength and high impact resistance, an extremely smooth and clean main surface. Specifically, for example, the surface roughness (Ra) of the glass substrate main surface measured by an atomic force microscope (AFM) is required to be 0.15 nm or less and, in order to prevent the occurrence of head crash, the main surface should be free of adhering matter, so that the main surface is required to be extremely smooth and clean as compared to conventional.

Under these circumstances, even if the chemical strengthening solution regeneration method disclosed in Patent Document 1 is applied to a glass article, there is a possibility that the regenerating substance such as the clay adheres to surfaces of the glass article and cannot be removed by cleaning thereafter so that the glass article cannot be used as a magnetic disk glass substrate. Further, even if the regenerating substance disclosed in Patent Document 1 is added, there is a possibility that variation in inner diameter or variation in strength due to chemical strengthening is large and, as a consequence, there is a problem that it is difficult to obtain a strengthened glass with stable properties.

This invention has been made for solving the above-mentioned conventional problems and it is an object of this invention to provide an ion-exchanged glass article manufacturing method that can keep long the lifetime of a molten salt in chemical strengthening and that can obtain a strengthened glass product with stable properties. In particular, it is an object of this invention to provide an ion-exchanged glass article manufacturing method suitable for a glass substrate for a magnetic disk adapted to be mounted in a magnetic disk device such as HDD.

As a result of intensive studies to achieve the above-mentioned objects, the present inventor has completed this invention.

Specifically, this invention has the following structures.

(Structure 1)

A method of manufacturing an ion-exchanged glass article, comprising:

an ion-exchange step of bringing a glass article with a composition containing Li into contact with a molten salt dissolved solution containing an alkali metal element having an ionic radius larger than an ionic radius of the Li contained in the glass article, thereby ion-exchanging the Li in the glass article with the alkali metal element in the molten salt dissolved solution, wherein at least one kind of additive selected from a group consisting of NaF, KF, $K_3AlF_6$, $Na_2CO_3$, $NaHCO_3$, $K_2CO_3$, $KHCO_3$, $Na_2SO_4$, $K_2SO_4$, $KAl(SO_4)_2$, $Na_3PO_4$, and $K_3PO_4$ is added to the molten salt dissolved solution so that the ion-exchange step is carried out while the additive is in a solid state.

(Structure 2)

A method of manufacturing an ion-exchanged glass article, comprising:

an ion-exchange step of bringing a glass article with a composition containing Na into contact with a molten salt dissolved solution containing an alkali metal element having an ionic radius larger than an ionic radius of the Na contained in the glass article, thereby ion-exchanging the Na in the glass article with the alkali metal element in the molten salt dissolved solution, wherein at least one kind of additive selected from a group consisting of KCl, KBr, KF, $K_3AlF_6$, $K_2CO_3$, $KHCO_3$, $K_2SO_4$, $KAl(SO_4)_2$, and $K_3PO_4$ is added to the molten salt dissolved solution so that the ion-exchange step is carried out while the additive is in a solid state.

(Structure 3)

A method of manufacturing an ion-exchanged glass article, comprising:

an ion-exchange step of bringing a glass article with a composition containing Li into contact with a molten salt dissolved solution containing an alkali metal element having an ionic radius larger than an ionic radius of the Li contained in the glass article, thereby ion-exchanging the Li in the glass article with the alkali metal element in the molten salt dissolved solution, wherein an additive having a melting point higher than a heating temperature of the molten salt dissolved solution is added to the molten salt dissolved solution, the additive being adapted to react with the Li which is eluted from the glass article into the molten salt dissolved solution by the ion-exchange step to thereby precipitate as a solid a compound of the Li in the molten salt dissolved solution, so that the ion-exchange step is carried out while the additive is in a solid state.

(Structure 4)

The method according to any one of structures 1 to 3, wherein the ion exchange is low-temperature ion-exchange.

(Structure 5)

The method according to any one of structures 1 to 4, wherein the additive is selected so that even if a precipitate deposited in the molten salt dissolved solution by the ion-exchange step adheres to a surface of the glass article, the precipitate adhering to the surface of the glass article is removed by cleaning the glass article after the ion-exchange step.

(Structure 6)

The method according to any one of structures 1 to 5, wherein the additive is selected so that a precipitate deposited in the molten salt dissolved solution by the ion-exchange step has a specific gravity different from a specific gravity of the molten salt dissolved solution.

(Structure 7)

The method according to any one of structures 3 to 6, wherein the additive is a compound containing an alkali metal component.

(Structure 8)

The method according to structure 7, wherein the alkali metal component contained in the additive is the same as the alkali metal element contained in the molten salt dissolved solution.

(Structure 9)

The method according to any one of structures 1 to 8, wherein the glass article is a glass substrate for a magnetic disk.

According to an ion-exchanged glass article manufacturing method, it is possible to keep long the lifetime of a molten salt in chemical strengthening and to obtain a strengthened glass product with stable properties such as small variation in strength. In particular, it is possible to obtain an ion-exchanged glass article with stable properties which is suitable as a glass substrate for a magnetic disk adapted to be mounted in a magnetic disk device such as HDD.

DESCRIPTION OF THE EMBODIMENTS

Hereinbelow, embodiments of this invention will be described in detail.

According to one embodiment of this invention, as recited in aforementioned structure 1, a method of manufacturing an ion-exchanged glass article, comprising:

an ion-exchange step of bringing a glass article with a composition containing Li into contact with a molten salt dissolved solution containing an alkali metal element having an ionic radius larger than an ionic radius of the Li contained in the glass article, thereby ion-exchanging the Li in the glass article with the alkali metal element in the molten salt dissolved solution, wherein at least one kind of additive selected from a group consisting of NaF, KF, $K_3AlF_6$, $Na_2CO_3$, $NaHCO_3$, $K_2CO_3$, $KHCO_3$, $Na_2SO_4$, $K_2SO_4$, $KAl(SO_4)_2$, $Na_3PO_4$, and $K_3PO_4$ is added to the molten salt dissolved solution so that the ion-exchange step is carried out while the additive is in a solid state.

According to another embodiment of this invention, as recited in aforementioned structure 2, a method of manufacturing an ion-exchanged glass article, comprising:

an ion-exchange step of bringing a glass article with a composition containing Na into contact with a molten salt dissolved solution containing an alkali metal element having an ionic radius larger than an ionic radius of the Na contained in the glass article, thereby ion-exchanging the Na in the glass article with the alkali metal element in the molten salt dissolved solution, wherein at least one kind of additive selected from a group consisting of KCl, KBr, KF, $K_3AlF_6$, $K_2CO_3$, $KHCO_3$, $K_2SO_4$, $KAl(SO_4)_2$, and $K_3PO_4$ is added to the molten salt dissolved solution so that the ion-exchange step is carried out while the additive is in a solid state.

Important features of this invention are that it is possible to keep long the lifetime of a molten salt in chemical strengthening and to obtain a strengthened glass product with stable properties. That is, the prolongation of the lifetime of the molten salt and the stabilization of the properties of the strengthened glass product are the important features of this invention.

As described before, the chemical strengthening is a treatment in which a glass article is brought into contact with a molten chemical strengthening salt so that an alkali metal element having a relatively small ionic radius in the glass article is ion-exchanged with an alkali metal element having a relatively large ionic radius in the chemical strengthening salt, thereby generating compressive stress on surfaces of the glass article.

For example, in the case of a glass containing Li, Na, and K as alkali metals, chemical strengthening is carried out by immersing the glass in a mixed molten salt dissolved solution of, for example, $KNO_3$ and $NaNO_3$ so that part of alkali ions having small ionic radii are replaced by alkali metals having larger ionic radii. The order of magnitudes of the ionic radii is $Li^+<Na^+<K^+$.

When a glass article with a composition containing Li is ion-exchanged in a molten salt dissolved solution containing Na and/or K, Li ions are eluted from the glass article. Then, as the Li ions increase in the molten salt dissolved solution, Na ions and/or K ions introduced into the glass article by the ion exchange and the Li ions in the molten salt dissolved solution are in an equilibrium state so that Na ions and/or K ions in the molten salt dissolved solution no longer enter the glass article.

Therefore, conventionally, it is necessary to change the molten salt dissolved solution to new one before the concentration of Li ions, which serve as chemical strengthening inhibiting ions, in the molten salt dissolved solution reaches a predetermined value. In the conventional case, there arises not only a problem that a large amount of a new molten salt dissolved solution should be stocked, but also a problem that the glass strengthening degree changes along with the change in concentration of Li ions in the molten salt dissolved solution so that a strengthened glass with uniform properties cannot be obtained.

In order to solve such conventional problems, in this invention, use is made of an additive that is a solid at a heating temperature of a molten salt dissolved solution (a temperature at which a molten salt is dissolved), i.e. a temperature at which ion exchange is carried out, and that is adapted to react with Li ions (or Na ions) eluted from a glass into the molten salt dissolved solution to thereby discharge the Li ions (or Na ions) as a precipitate from the reaction system, i.e. from the molten salt dissolved solution (from the liquid state). If salts of Na and K (e.g. carbonates) which are each a solid at a heating temperature (ion-exchange temperature) of, for example, a mixed molten salt dissolved solution of $KNO_3$ and $NaNO_3$ or a molten salt dissolved solution of $KNO_3$ or $NaNO_3$ alone are used as such additives, while the carbonates of Na and K remain as solids in the molten salt dissolved solution, Na and K of the carbonates are replaced by Li ions present in the molten salt dissolved solution so that $Li_2CO_3$ is produced and is deposited and removed as a solid.

The above description has been given for the case where the glass containing Li, Na, and K as alkali metals is chemically strengthened. In the case of ion-exchanging a glass free of Li and containing Na and K or containing Na, $KNO_3$ may be used as a composition (main agent) of a molten salt and $K_2CO_3$, i.e. a K carbonate, may be added as an additive, for example.

That is, in this case, since Na ions serve as chemical strengthening inhibiting ions, the Na ions are selectively precipitated as a carbonate and removed from the reaction system. Since the melting point of $Na_2CO_3$ is 851° C. and the melting point of $K_2CO_3$ is 891° C., if ion exchange is carried out at a temperature below those melting points, $Na_2CO_3$ and $K_2CO_3$ can be precipitated as solids from the molten salt dissolved solution.

If chemical strengthening is carried out without adding such an additive in the molten salt dissolved solution (conventional method), Na ions are gradually accumulated in the molten salt dissolved solution and return into the glass so that the strengthening reaction is difficult to proceed.

This invention is applicable to a glass article with a composition containing at least one of Li and Na as an alkali metal. Accordingly, in addition to the glass containing Li, Na, and K, the glass containing Na and K, and the glass containing Na, this invention is also applicable to chemical strengthening of a glass containing Li, a glass containing Li and Na, a glass containing Li and K, and so on.

As described above, the composition of a molten salt for chemical strengthening of a glass differs depending on the glass composition and, further, a substance of an additive which is added in this invention to keep long the lifetime of a molten salt and thus to keep constant the stability of chemical strengthening also differs depending on the glass composition. The point is such that, in the case of, for example, a glass article with a composition containing Li, an additive having a melting point higher than a heating temperature (ion-exchange temperature) of a molten salt dissolved solution and adapted to react with Li, eluted from the glass article into the molten salt dissolved solution by an ion-exchange step, to precipitate as a solid a compound of the Li in the molten salt dissolved solution is added to the molten salt dissolved solution, thereby carrying out the ion-exchange step while the additive is in a solid state.

More preferably, the product compound and the additive can be dissolved in, for example, water and thus can be removed by cleaning. It is particularly preferable that the molten salt main agent be regenerated by the reaction between the additive and the inhibiting ions eluted from the glass.

In this invention, as the additive to be added to the molten salt dissolved solution, use is preferably made of, for example, a carbonate of Na or K, a phosphate of Na or K, a sulfate of Na or K, or a fluoride of Na or K.

Specific examples of preferred combinations of a glass strengthening salt composition and an additive in this invention are shown below, but this invention is not limited thereto.

For chemical strengthening of a glass containing Li as an alkali metal, a glass containing Li and Na as alkali metals, a glass containing Li and K as alkali metals, or a glass containing Li, Na, and K as alkali metals, it is possible to preferably use, as a composition of a main agent of a molten salt, one of $NaNO_3$, $KNO_3$, and a mixed salt of $NaNO_3$ and $KNO_3$, for example. For any of these molten salts, it is possible to preferably use, as an additive, at least one kind of additive selected from the group consisting of NaF, KF, $K_3AlF_6$, $Na_2CO_3$, $NaHCO_3$, $K_2CO_3$, $KHCO_3$, $Na_2SO_4$, $K_2SO_4$, $KAl(SO_4)_2$, $Na_3PO_4$, and $K_3PO_4$, for example.

For chemical strengthening of a glass with a composition free of Li and containing Na as an alkali metal or a glass with a composition free of Li and containing Na and K as alkali metals, it is possible to preferably use, for example, $KNO_3$ as a composition of a main agent of a molten salt. For this molten salt, it is possible to preferably use, as an additive, at least one kind of additive selected from the group consisting of KCl, KBr, KF, $K_3AlF_6$, $K_2CO_3$, $KHCO_3$, $K_2SO_4$, $KAl(SO_4)_2$, and $K_3PO_4$, for example.

Among the above-mentioned additives, in this invention, the fluoride of Na or K is preferable, the phosphate of Na or K is more preferable, the sulfate of Na or K is particularly preferable, and the carbonate of Na or K is most preferable. Among them, the sulfate, the carbonate, or the phosphate is preferable in terms of preventing damage to a chemical strengthening bath in which ion exchange is carried out, or in terms of preventing damage to surfaces of a strengthened glass article due to cleaning after ion exchange. When the glass article is a glass substrate for a magnetic disk, it is particularly preferable to use a neutral sulfate or a weak base carbonate in order to suppress an increase in surface roughness due to ion exchange or cleaning thereafter.

When selecting the additive, a selection is preferably made so that a reaction product which is precipitated as a solid in a molten salt dissolved solution by reaction between the additive and an alkali metal with a small ionic radius, for example, Li, eluted from a glass into the molten salt dissolved solution by an ion-exchange step forms a neutral solution on glass surfaces when a molten chemical strengthening salt adhered to the substrate surface is removed after the chemical strengthening (e.g. when the reaction product is brought into contact with water in a cooling process (also called a heat shock process) that lowers the temperature of the glass after the chemical strengthening, or in a cleaning process after the chemical strengthening). The reason for this is that if the reaction product becomes, for example, strongly alkaline when it is brought into contact with water, there is a possibility that the glass surfaces are etched resulting in degradation of the surface roughness.

As described above, in chemical strengthening of, for example, the glass containing Li as the alkali metal, the sulfate or carbonate of Na or K, for example, is used as the additive. If the sulfate of Na or K is added to the molten salt dissolved solution, Li ions eluted from the glass and present in the molten salt dissolved solution (present as $LiNO_3$) undergo substitution reaction with Na or K of the sulfate to produce $Li_2SO_4$, as shown by the following chemical equations.

$$2LiNO_3 + Na_2SO_4 \rightarrow Li_2SO_4 + 2NaNO_3$$

$$2LiNO_3 + K_2SO_4 \rightarrow Li_2SO_4 + 2KNO_3$$

In this case, $Li_2SO_4$ is precipitated as a solid in the molten salt dissolved solution, while when it is brought into contact with water in the cooling process, the cleaning process, or the like of the glass after the chemical strengthening, it is dissolved and becomes neutral to form a neutral solution (pH=about 7) on the glass surfaces so that the surface roughness of the glass is not degraded, which is thus preferable.

On the other hand, if the carbonate of Na or K is added to the molten salt dissolved solution, Li ions eluted from the glass and present in the molten salt dissolved solution (present as $LiNO_3$) undergo substitution reaction with Na or K of the carbonate to produce $Li_2CO_3$, as shown by the following chemical equations.

$$2LiNO_3 + Na_2CO_3 \rightarrow Li_2CO_3 + 2NaNO_3$$

$$2LiNO_3 + K_2CO_3 \rightarrow Li_2CO_3 + 2KNO_3$$

In this case, $Li_2CO_3$ is precipitated as a solid in the molten salt dissolved solution, while when it is brought into contact with water in the cooling process, the cleaning process, or the like of the glass after the chemical strengthening, it is dissolved and becomes strongly alkaline to form a strong alkaline solution (pH>10) on the glass surfaces so that there is a possibility of degrading the surface roughness of the glass to a degree or corroding a chemical strengthening bath (generally made of a stainless-steel material).

Therefore, in chemical strengthening of the glass containing Li as the alkali metal, it is preferable to use particularly the sulfate of Na or K as the additive in terms of the surface roughness of the glass after the chemical strengthening. If the sulfate of K is used, since $KNO_3$ is produced as shown by the chemical equation given above, it is more preferable because K ions in the molten salt dissolved solution which are reduced as the chemical strengthening proceeds can be supplemented.

In the case where the carbonate of Na or K is added to the molten salt dissolved solution, it is preferable to make a solution on the glass surfaces neutral by contacting the glass with a weak acid or a buffer solution before the glass is brought into contact with water in the cooling process, the cleaning process, or the like. In this manner, degradation of the surface roughness can be prevented.

The addition amount of the additive is set to a value large enough to deposit, as a solid precipitate, ions eluted from a glass into a molten salt dissolved solution, but small enough not to hinder chemical strengthening due to its precipitation to the bottom or its floating in large amount. The additive may be added, for example, before carrying out ion exchange and, in the case of ion-exchanging a number of glass articles, for example, by batch processing, the additive may be added per batch or per several batches. The structure of a chemical strengthening bath for carrying out ion exchange may be, for example, a batch-type strengthening bath in which a plurality of glasses are ion-exchanged at a time and then replaced with new ones, or a continuous-type strengthening bath in which glasses are continuously transferred and ion-exchanged.

As described above, in this invention, the important points are that an additive to be added to a molten salt dissolved solution has a melting point higher than a heating temperature of the molten salt dissolved solution, thereby carrying out an ion-exchange step while the additive is in a solid state, and that, by adding the additive to the molten salt dissolved solution, the additive reacts with an alkali metal such as Li having a small ionic radius and eluted from a glass into the molten salt dissolved solution by the ion-exchange step, thereby precipitating as a solid a compound of the Li in the molten salt dissolved solution. In this invention, in order to prevent alkali metal ions with a small ionic radius, eluted from the glass into the molten salt dissolved solution and serving to inhibit chemical strengthening, from being present as ions in the molten salt dissolved solution, the additive is added to the molten salt dissolved solution to precipitate a compound of the alkali metal ions as a solid, thereby suppressing accumulation of the inhibiting ions.

When Li is contained in the glass to be chemically strengthened, Li ions are easily dissolved in the molten salt dissolved solution as compared with Na ions or the like and, therefore, this invention is particularly effective for chemical strengthening of the glass with the composition containing Li.

It is particularly preferable to select the additive so that even if the precipitate deposited in the molten salt dissolved solution by the ion-exchange step adheres to surfaces of the glass article, the precipitate adhering to the surfaces of the glass article can be removed by cleaning the glass article after the ion-exchange step. For this, it is preferable that the precipitate can be dissolved in, for example, water, acid, weak alkali, or the like.

It is particularly preferable to select the additive so that the precipitate deposited in the molten salt dissolved solution by the ion-exchange step has a specific gravity different from that of the molten salt dissolved solution. This is because the precipitate can be easily removed from the molten salt dissolved solution by filtration or the like.

In particular, it is preferable to determine the composition of the molten salt and the composition of the additive so that the precipitate stays at the bottom of the chemical strengthening bath in which the ion exchange is carried out, or that the precipitate floats in the molten salt dissolved solution. When the compositions of the molten salt and the additive are determined so that the precipitate stays at the bottom of the chemical strengthening bath, it is possible to prevent the precipitate from adhering to the surfaces of the glass article to be ion-exchanged. On the other hand, when the compositions of the molten salt and the additive are determined so that the precipitate floats in the molten salt dissolved solution, it is easy to remove the precipitate. In particular, in the case of a glass substrate for a magnetic disk, substrate surfaces are required to be free of adhesion of foreign matter and thus it is particularly preferable that the substrate surfaces be free of adhesion of the precipitate.

The additive may be added to the molten salt dissolved solution, for example, in the form of powder or in the form of lumps such as pellets. In particular, in terms of the reaction surface area with the alkali metal ions in the glass composition which are eluted into the molten salt dissolved solution and in terms of ease of handling, the additive is preferably added in the form of lumps of 5 to 50 g. The molten salt dissolved solution may be circulated through a circulation path and a filter may be provided in the circulation path, thereby capturing the precipitate.

The additive used in this invention is preferably a compound containing an alkali metal component and it is particularly preferable that the alkali metal component contained in the additive be the same as the alkali metal contained in the molten salt dissolved solution. Although the alkali metal component contained in the additive is not necessarily the same as the alkali metal contained in the molten salt dissolved solution, if they are the same, then it is more preferable because alkali metal ions in the molten salt dissolved solution which are reduced by ion exchange between alkali metal ions in the glass and the alkali metal ions in the molten salt dissolved solution can be supplemented by alkali metal ions contained in the additive. More specifically, alkali metal ions eluted from the glass into the molten salt dissolved solution form a precipitate through solid-state reaction with the additive. In this event, alkali metal ions are released from the additive. If the alkali metal ions released from the additive are the same as alkali metal ions in the molten salt dissolved solution which are used for ion-exchanging the glass, the alkali metal ions in the molten salt dissolved solution which are reduced by the ion exchange can be supplemented. That is, in terms of regenerating the molten salt main agent to keep constant the alkali metal ion concentration in the molten salt, the use of the same alkali metal ions is more preferable. In this case, the molten salt can be used semipermanently on a theoretical basis and thus does not need to be replaced with new one and it is sufficient to add a new molten salt depending on need and to remove unwanted reaction products at times.

As described above, in this invention, since it is possible to prevent the alkali metal ions with the small ionic radius, eluted from the glass by the ion-exchange step, from being accumulated in the molten salt dissolved solution and inhibiting the ion exchange, it is possible to keep long the lifetime of the molten salt and thus to significantly reduce the number of times of replacement of the molten salt. As described above, it is possible to even substantially eliminate the replacement of the molten salt. Further, there occurs no such conventional disadvantage that the glass strengthening degree changes along with the change in concentration of the inhibiting ions in the molten salt dissolved solution and, therefore, variation in strength is small so that it is possible to stably manufacture strengthened glass products with uniform properties.

This invention is particularly suitable for the manufacture of a glass substrate for a magnetic disk. The magnetic disk glass substrate requires high strength as compared with other glass articles and chemical strengthening is essential for improving the strength. Hereinbelow, a description will be given of a magnetic disk glass substrate and its manufacturing method to which this invention can be suitably applied.

Normally, a magnetic disk glass substrate is manufactured through a rough grinding process (rough lapping process), a shaping process, a precision grinding process (precision lapping process), an end face polishing process, a main surface polishing process (first and second polishing processes), and a chemical strengthening process.

In the manufacture of the magnetic disk glass substrate, first, a molten glass is molded into a disk-shaped glass substrate (glass disk) by direct pressing. Alternatively, a plate glass may be manufactured by a downdraw method or a float method and then cut into a disk-shaped glass substrate (glass disk) with a predetermined size. Then, this molded glass substrate (glass disk) is ground (lapped) for improving the dimensional accuracy and shape accuracy thereof. In this grinding process, using normally a double-side lapping machine, main surfaces of the glass substrate are ground by the use of hard abrasive particles such as diamond abrasive particles. By grinding the main surfaces of the glass substrate in this manner, the glass substrate is machined to a predetermined thickness, flatness, and surface roughness.

After the completion of the grinding process, mirror polishing is carried out for obtaining a high-precision flat surface. Preferably, a glass substrate mirror-polishing method is carried out using polishing pads such as polyurethane polishing pads while supplying a slurry (polishing liquid) containing a polishing abrasive of metal oxide such as cerium oxide or colloidal silica.

A polishing liquid conventionally used in polishing is basically a combination of a polishing abrasive and water as a solvent and further contains a pH adjusting agent for adjusting the pH of the polishing liquid and other additives if necessary.

The polishing liquid containing colloidal silica abrasive particles or the like may be obtained using pure water, for example, RO water. Herein, the RO water represents RO (reverse osmosis)-treated pure water. It is particularly preferable to use RO-treated and DI-treated (deionized) RO-DI water. This is because the content of impurities such as alkali metals is extremely low and further the content of ions is also low in the RO or RO-DI water.

The polishing liquid which is applied to the polishing process is, for example, adjusted to the acidic region. For example, the polishing liquid is adjusted to a pH range of 2 to 4 by adding sulfuric acid thereto. The reason that the polishing liquid adjusted to the acidic region is preferably used is in terms of the productivity and cleanness.

The polishing abrasive particles such as colloidal silica contained in the polishing liquid preferably have an average particle size of about 10 to 100 nm in terms of the polishing efficiency. In particular, in this invention, polishing abrasive particles contained in a polishing liquid for use in a finish mirror polishing process (later-described second polishing process) preferably have an average particle size of about 10 to 40 nm in terms of further reducing the surface roughness. More preferably, the average particle size is in a range of about 10 to 20 nm.

The polishing method in the polishing process is not particularly limited. For example, the glass substrate and the polishing pads are brought into contact with each other and, while supplying the polishing liquid containing the polishing abrasive particles, the polishing pads and the glass substrate are moved relative to each other, thereby polishing the surfaces of the glass substrate to mirror surfaces. For example, a planetary gear type double-side polishing machine can be used.

As each polishing pad particularly for finish mirror polishing, it is preferable to use a soft-polisher polishing pad (suede pad). The hardness of the polishing pad is preferably 60 or more and 80 or less in Asker C hardness. A contact surface, with the glass substrate, of the polishing pad is preferably a resin foam, particularly a polyurethane foam, with foam pores open. When polishing is carried out in this manner, it is possible to polish the surfaces of the glass substrate to smooth mirror surfaces.

The type of glass forming the glass substrate is preferably an amorphous aluminosilicate glass. The surfaces of such a glass substrate can be finished to smooth mirror surfaces by mirror polishing and are suitable for ion exchange. As such an aluminosilicate glass, use can be made of, for example, an aluminosilicate glass which is free of phosphorus oxide and contains, as main components, 58 wt % to 75 wt % $SiO_2$, 5 wt % to 23 wt % $Al_2O_3$, 3 wt % to 10 wt % $Li_2O$, and 4 wt % to 13 wt % $Na_2O$ in terms of oxide. Alternatively, for example, use can be made of an amorphous aluminosilicate glass which is free of phosphorus oxide and contains, as main components, 62 wt % to 75 wt % $SiO_2$, 5 wt % to 15 wt % $Al_2O_3$, 4 wt % to 10 wt % $Li_2O$, 4 wt % to 12 wt % $Na_2O$, and 5.5 wt % to 15 wt % $ZrO_2$, wherein the weight ratio of $Na_2O/ZrO_2$ is 0.5 or more and 2.0 or less and the weight ratio of $Al_2O_3/ZrO_2$ is 0.4 or more and 2.5 or less. The glass may contain an alkaline earth metal oxide such as CaO or MgO. As another preferred example, use can be made of an aluminosilicate glass containing, in terms of oxide, 63 mol % to 70 mol % $SiO_2$, 4 mol % to 11 mol % $Al_2O_3$, 5 mol % to 11 mol % $Li_2O$, 6 mol % to 14 mol % $Na_2O$, 0 to 2 mol % $K_2O$, 0 to 5 mol % $TiO_2$, 0 to 2.5 mol % $ZrO_2$, and 2 mol % to 15 mol % RO, wherein RO=MgO+CaO+SrO+BaO (MgO: 0 to 6 mol %, CaO: 1 mol % to 9 mol %, SrO: 0 to 3 mol %, BaO: 0 to 2 mol %, balance: 0 to 3 mol %) and the difference ($SiO_2$—$Al_2O_3$) in mol % between $SiO_2$ and $Al_2O_3$ is 56.5 mol % or more.

There is a case where heat resistance is required as a property of a next-generation substrate. As a heat-resistant glass in this case, use can be preferably made of, for example, a glass containing 50 mol % to 75 mol % $SiO_2$, 0 to 6 mol % $Al_2O_3$, 0 to 2 mol % BaO, 0 to 3 mol % $Li_2O$, 0 to 5 mol % ZnO, 3 mol % to 15 mol % $Na_2O$ and $K_2O$ in total, 14 mol % to 35 mol % MgO, CaO, SrO, and BaO in total, and 2 mol % to 9 mol % $ZrO_2$, $TiO_2$, $La_2O_3$, $Y_2O_3$, $Yb_2O_3$, $Ta_2O_5$, $Nb_2O_5$, and $HfO_2$ in total, wherein the mole ratio of [(MgO+CaO)/ (MgO+CaO+SrO+BaO)] is in a range of 0.85 to 1 and the mole ratio of [$Al_2O_3$/ (MgO+CaO)] is in a range of 0 to 30. Use can also be preferably made of a glass containing 50 mol % to 75 mol % $SiO_2$, 10 mol % to 20 mol % $Al_2O_3$, 0 to 3 mol % $Li_2O$, 5 mol % to 20 mol % $Na_2O$, and 8 mol % to 15 mol % MgO and CaO in total, wherein Tg is 650° C. or more.

In this invention, the surface of the glass substrate after the above-mentioned mirror polishing, i.e. the main surface of the magnetic disk glass substrate, is preferably a mirror surface with an arithmetic average roughness Ra of 0.15 nm or less and further with a maximum roughness Rmax of 1.0 nm or less as a result of measuring a 1 μm×1 μm square area with a resolution of 512×256 pixels using an atomic force microscope (AFM). In this invention, Ra and Rmax each represent a roughness which is calculated according to the Japanese Industrial Standard (JIS) B 0601.

As described above, in the case of the magnetic disk glass substrate, chemical strengthening is essential for improving its strength.

In this invention, it is preferable to carry out chemical strengthening before or after the mirror polishing process. As a chemical strengthening method, it is preferable to use, for example, a low-temperature ion-exchange method which performs ion exchange in a temperature range not exceeding the glass transition point, for example, at a temperature of 300° C. or more and 500° C. or less.

Details of the chemical strengthening (ion-exchange step) in this invention are as described above. The chemical strengthening is carried out by placing a number of glass substrates in a substrate holder generally called a rack and immersing the substrate holder with the glass substrates in a molten salt dissolved solution (chemical strengthening solution) in which a chemical strengthening salt is heated and dissolved. After the chemical strengthening, a cooling process may be provided in which the glass substrates are taken out from the molten salt dissolved solution and immersed in an aqueous solution bath while being placed in the substrate holder, thereby lowering the temperature of the glass substrates.

Since the chemically strengthened glass substrate is excellent in impact resistance, it is particularly suitable for mounting in an HDD for mobile use, for example. In particular, in this invention, variation in inner diameter and variation in strength due to chemical strengthening are small and thus it is possible to stably manufacture magnetic disk glass substrates with uniform properties.

Using the magnetic disk glass substrate manufactured by the manufacturing method of this invention, a magnetic disk can be manufactured. Specifically, the magnetic disk is manufactured by forming at least a magnetic layer on the magnetic disk glass substrate. As a material of the magnetic layer, use can be made of a hexagonal-system CoCrPt-based or CoPt-based ferromagnetic alloy with a large anisotropic magnetic field. The magnetic layer is preferably formed on the glass substrate by sputtering, for example, DC magnetron sputtering. By interposing an underlayer between the glass substrate and the magnetic layer, it is possible to control the orientation direction and size of magnetic particles in the magnetic layer. For example, using a hexagonal-system underlayer containing Ru and Ti, it is possible to orient the easy magnetization direction of the magnetic layer along the normal of the plane of the magnetic disk. In this case, the magnetic disk of the perpendicular magnetic recording type is manufactured. The underlayer can be formed by sputtering like the magnetic layer.

It is preferable to form a protective layer and a lubricating layer in this order on the magnetic layer. As the protective layer, it is preferable to use an amorphous hydrogenated carbon-based protective layer. As the lubricating layer, use can be made of a lubricant having a functional group at the ends of the main chain of a perfluoropolyether compound.

Using the magnetic disk glass substrate obtained by this invention, the highly reliable magnetic disk can be obtained.

EXAMPLES

Hereinbelow, this invention will be described in further detail with reference to specific Examples. This invention is not limited to the following Examples.

Example 1

A magnetic disk glass substrate of this Example was manufactured through (1) Rough Lapping Process (Rough Grinding Process), (2) Shaping Process, (3) Precision Lapping Process (Precision Grinding Process), (4) End Face Polishing Process, (5) Main Surface First Polishing Process, (6) Chemical Strengthening Process, and (7) Main Surface Second Polishing Process, which will be described hereinbelow.

(1) Rough Lapping Process

First, a disk-shaped glass substrate made of an aluminosilicate glass and having a diameter of 66 mm and a thickness of 1.0 mm was obtained from a molten glass by direct pressing using upper, lower, and drum molds. Alternatively, a plate glass may be manufactured by a downdraw method or a float method and then cut into a disk-shaped glass substrate with a predetermined size. As the aluminosilicate glass, use was made of a glass for chemical strengthening containing 58 wt % to 75 wt % $SiO_2$, 5 wt % to 23 wt % $Al_2O_3$, 3 wt % to 10 wt % $Li_2O$, and 4 wt % to 13 wt % $Na_2O$.

Then, a lapping process was applied to the glass substrate for improving the dimensional accuracy and shape accuracy thereof. This lapping process was carried out using a double-side lapping machine by the use of abrasive particles of particle size #400. Specifically, the glass substrate held by a carrier was placed in tight contact between upper and lower surface plates in the lapping machine and, then, by setting the load to about 100 kg and rotating a sun gear and an internal gear of the lapping machine, both main surfaces of the glass substrate received in the carrier were lapped to a surface accuracy of 0 to 1 μm and to a surface roughness (Rmax) of about 6 μm.

(2) Shaping Process

Then, using a cylindrical grindstone, a hole was formed at a central portion of the glass substrate. Then, grinding was applied to an outer peripheral end face to obtain an outer diameter of 65 mm and then predetermined chamfering was applied to the outer peripheral end face and an inner peripheral end face. In this event, the surface roughness of the end faces of the glass substrate was about 4 μm in Rmax. In general, a magnetic disk with an outer diameter of 65 mm is used in a 2.5-inch HDD (hard disk drive).

(3) Precision Lapping Process

Using a double-side lapping machine, this precision lapping process was carried out by placing the glass substrate, held by a carrier, in tight contact between upper and lower surface plates that were bonded with pellets containing diamond abrasive particles of particle size #1000 fixed with acrylic resin.

Specifically, by setting the load to about 100 kg and rotating a sun gear and an internal gear of the lapping machine, both main surfaces of the glass substrate received in the carrier were lapped to a surface roughness of about 2 μm in Rmax and about 0.2 μm in Ra.

The glass substrate having been subjected to the precision lapping process was immersed in respective cleaning baths (ultrasonic wave was applied) of neutral detergent and water in turn so as to be ultrasonically cleaned.

(4) End Face Polishing Process

Then, by brush polishing, the inner and outer peripheral end faces of the glass substrate were polished to a surface roughness of 1 μm in Rmax and about 0.3 μm in Ra while rotating the glass substrate. Then, the surfaces of the glass substrate having been subjected to the above-mentioned end face polishing were washed with water.

(5) Main Surface First Polishing Process

Then, a first polishing process for removing cracks or strains remaining in the above-mentioned lapping process was carried out using a double-side polishing machine. In the double-side polishing machine, the glass substrate held by a carrier is placed in tight contact between upper and lower surface plates each bonded with a polishing pad, the carrier is brought into mesh with a sun gear and an internal gear, and the glass substrate is pressed between the upper and lower surface plates. Then, by rotating the upper and lower surface plates while supplying a polishing liquid between the polishing pads and the polishing surfaces of the glass substrate, the glass substrate makes an orbital motion while rotating on its axis on the surface plates so that both main surfaces of the glass substrate are polished simultaneously. Specifically, using a hard polisher (hard urethane foam) as a polisher, the first polishing process was carried out. The pH of the polishing liquid was adjusted to neutral by adding an ethanol-based low molecular weight surfactant to RO water in which 10 wt % cerium oxide (average particle size: 1 μm) was dispersed as a polishing abrasive. The load was set to 100 g/cm$^2$ and the polishing time was set to 15 minutes.

The glass substrate having been subjected to the first polishing process was immersed in respective cleaning baths of neutral detergent, pure water, pure water, IPA (isopropyl alcohol), and IPA (vapor drying) in turn so as to be ultrasonically cleaned and dried.

(6) Chemical Strengthening Process

Then, chemical strengthening was applied to the glass substrate having been subjected to the above-mentioned cleaning. The chemical strengthening was carried out by preparing a molten salt in the form of a mixture (mole ratio 6:4) of potassium nitrate ($KNO_3$) and sodium nitrate ($NaNO_3$), adding sodium carbonate ($Na_2CO_3$) as an additive in the ratio of 70 g (addition amount)/4.5 kg (molten salt main agent weight), heating the molten salt added with the additive to 360 to 380° C. to obtain a molten salt dissolved solution, and then immersing the glass substrate in the molten salt dissolved solution.

The glass substrate having been subjected to the chemical strengthening was immersed in respective cleaning baths of sulfuric acid, pure water, IPA, and IPA (vapor drying) in turn so as to be ultrasonically cleaned and dried. A precipitate deposited in the molten salt dissolved solution after the completion of the chemical strengthening was analyzed and it was confirmed to be lithium carbonate.

(7) Main Surface Second Polishing Process

Then, a second polishing process was carried out using the same double-side polishing machine used in the first polishing process while changing the polishing pads to soft-polisher (suede) polishing pads (polyurethane foam with Asker C hardness of 72). This second polishing process is a mirror polishing process for finishing the main surfaces of the glass substrate to smooth mirror surfaces with a surface roughness of, for example, about 2 nm or less in Rmax while maintaining the flat surfaces obtained in the first polishing process. A polishing liquid used was adjusted to be acidic (pH=2) by adding sulfuric acid to RO water in which 15 wt % colloidal silica (average particle size: 15 nm) was dispersed as a polishing abrasive. The load was set to 100 g/cm$^2$ and the polishing time was set to 10 minutes.

In this manner, 1000 magnetic disk glass substrates of this Example were manufactured.

The surface roughness of the main surfaces of the obtained glass substrates was measured using an atomic force microscope (AFM). As a result, the surface roughness was 0.12 nm in Ra, representing an ultra-smooth surface. The surface roughness value is the average value of the manufactured 1000 glass substrates.

With respect to the manufactured 1000 magnetic disk glass substrates, variation in strength was evaluated.

The variation in strength was evaluated by the following method. A steel ball was placed at an inner-diameter portion of the magnetic disk glass substrate and, while holding the outer periphery of the glass substrate, the steel ball was pushed down and the load at the time of breakage of the glass substrate was measured. Then, the ratio of the glass substrates which were not broken even when a load of 6 kgf was applied was evaluated. For the measurement of strength, "Autograph AG-15kN" manufactured by Shimadzu Corporation was used.

Further, variation in inner diameter was confirmed for each glass substrate. Specifically, inner-diameter values of the glass substrate after the chemical strengthening were measured. Then, the ratio of the glass substrates whose inner-diameter value was within a predetermined inner-diameter tolerance (20.00±0.025 mm) was calculated. Thus, variation in inner diameter was evaluated.

Further, the glass substrates before the chemical strengthening were each subjected to a surface defect inspection using an optical defect inspection apparatus (manufactured by KLA-Tencor Corporation, product name: OSA6100). In this event, an area of 15 mm to 31.5 mm from the center of the glass substrate was measured under measurement conditions of a laser power of 25 mW, a laser wavelength of 405 nm, and a laser spot size of 5 μm, and the number of defects detected to have a size of 0.1 μm or more and 0.3 μm or less was counted. Then, the glass substrates after the chemical strengthening and subsequent water cleaning were each subjected to a surface defect inspection under the same conditions as described above and the number of defects was counted in the same manner as described above. Then, the difference between the numbers of the defects was calculated and defined as surface foreign matter (surface adhering matter) which adhered to the glass substrate due to the chemical strengthening.

The results thus obtained are collectively shown in Table 1 below.

Example 2

The chemical strengthening process was carried out in the same manner as in Example 1 except that, instead of sodium carbonate ($Na_2CO_3$), sodium phosphate ($Na_3PO_4$) was added as an additive in the ratio of 70 g (addition amount)/4.5 kg (molten salt main agent weight) in the chemical strengthening process in Example 1, thereby manufacturing 1000 magnetic disk glass substrates.

Example 3

The chemical strengthening process was carried out in the same manner as in Example 1 except that, instead of sodium carbonate ($Na_2CO_3$), potassium sulfate ($K_2SO_4$) was added as an additive in the ratio of 70 g (addition amount)/4.5 kg (molten salt main agent weight) in the chemical strengthening process in Example 1, thereby manufacturing 1000 magnetic disk glass substrates.

inner diameter, and surface adhering matter were evaluated in the same manner as in Example 1 and the results are collectively shown in Table 1 below.

Comparative Example 1

The chemical strengthening process was carried out in the same manner as in Example 1 except that the additive was not added in the molten salt dissolved solution in the chemical strengthening process in Example 1, thereby manufacturing 1000 magnetic disk glass substrates.

Comparative Example 2

The chemical strengthening process was carried out in the same manner as in Example 1 except that, instead of sodium carbonate ($Na_2CO_3$), hectorite was added as an additive in the ratio of 70 g (addition amount)/4.5 kg (molten salt main agent weight) in the chemical strengthening process in Example 1, thereby manufacturing 1000 magnetic disk glass substrates.

With respect also to the magnetic disk glass substrates obtained in Comparative Examples 1 and 2, variation in strength, variation in inner diameter, and surface adhering matter were evaluated in the same manner as in Example 1 and the results are collectively shown in Table 1 below.

TABLE 1

| | molten salt main agent 1 | molten salt main agent 2 | additive | evaluation of variation in strength (*1) | evaluation of variation in inner diameter (*2) | surface adhering matter |
|---|---|---|---|---|---|---|
| Example 1 | potassium nitrate | sodium nitrate | sodium carbonate | 100% | 100% | ◎ |
| Example 2 | potassium nitrate | sodium nitrate | sodium phosphate | 100% | 100% | ◎ |
| Example 3 | potassium nitrate | sodium nitrate | potassium sulfate | 100% | 100% | ◎ |
| Example 4 | potassium nitrate | sodium nitrate | potassium fluoride | 100% | 100% | ○ |
| Example 5 | potassium nitrate | | sodium carbonate | 100% | 100% | ◎ |
| Comparative Example 1 | potassium nitrate | | no additive | 90% | 89% | ◎ |
| Comparative Example 2 | potassium nitrate | | hectorite | 97% | 95% | X |

(*1) ratio of glass substrates which were not broken even when a load of 6 kgf was applied
(*2) ratio of glass substrates whose inner-diameter value was within a predetermined inner-diameter tolerance (20.00 ± 0.025 mm)

Example 4

The chemical strengthening process was carried out in the same manner as in Example 1 except that, instead of sodium carbonate ($Na_2CO_3$), potassium fluoride (KF) was added as an additive in the ratio of 70 g (addition amount)/4.5 kg (molten salt main agent weight) in the chemical strengthening process in Example 1, thereby manufacturing 1000 magnetic disk glass substrates.

Example 5

The chemical strengthening process was carried out in the same manner as in Example 1 except that only potassium nitrate ($KNO_3$) was used as a molten salt dissolved solution in the chemical strengthening process in Example 1, thereby manufacturing 1000 magnetic disk glass substrates.

With respect also to the magnetic disk glass substrates obtained in Examples 2 to 5, variation in strength, variation in In Table 1, with respect to "Surface Adhering Matter", the number of defects per main surface of the glass substrate is 3 or less in the case of ◎, 3 to 50 in the case of o, and more than 50 in the case of x.

Example 6

Magnetic disk glass substrates were manufactured in the same manners as in Example 1 and Comparative Examples 1 and 2 except for using a glass containing 58 wt % to 66 wt % $SiO_2$, 13 wt % to 19 wt % $Al_2O_3$, 3 wt % to 4.5 wt % $Li_2O$, 6 wt % to 13 wt % $Na_2O$, 0 to 5 wt % $K_2O$, 10 wt % to 18 wt % $R_2O$ (where $R_2O=Li_2O+Na_2O+K_2O$), 0 to 3.5 wt % MgO, 1 wt % to 7 wt % CaO, 0 to 2 wt % SrO, 0 to 2 wt % BaO, 2 wt % to 10 wt % RO (where RO=MgO+CaO+SrO+BaO), 0 to 2 wt % $TiO_2$, 0 to 2 wt % $CeO_2$, 0 to 2 wt % $Fe_2O_3$, and 0 to 1 wt % MnO, where $TiO_2+CeO_2+Fe_2O_3+MnO=0.01$ wt % to 3 wt %. As a result of evaluating variation in strength, variation in inner diameter, and surface adhering matter, the same results were obtained as those in Example 1 and Comparative Examples 1 and 2.

In each Example of this invention, the chemical strengthening of the 1000 glass substrates was continuously carried out and the molten salt was not changed during the chemical strengthening. However, as seen from the results shown in Table 1, variation in inner diameter and variation in strength were small in all the Examples of this invention. As a result of analyzing surface adhering matter detected in Example 1 and Comparative Example 2, the surface adhering matter detected in Example 1 was not derived from the additive while the surface adhering matter detected in Comparative Example 2 included a substance which was not detectable unless the additive was added. According to this invention, it is possible to keep long the lifetime of a molten salt in chemical strengthening (degradation of the molten salt is small) and thus it is possible to stably manufacture magnetic disk glass substrates with uniform properties, i.e. with small variation in inner diameter and small variation in strength.

On the other hand, in Comparative Example 1 in which the additive was not added in the molten salt dissolved solution, variation in inner diameter and variation in strength of the obtained glass substrates were large. With respect particularly to the glass substrates after the 500th, variation in inner diameter and variation in strength were large and, further, high strength required for a magnetic disk glass substrate was also not obtained. The reason for this is considered to be that since the chemical strengthening of the 1000 glass substrates was continuously carried out, the molten salt was degraded during the chemical strengthening so that the ion-exchange for chemical strengthening did not proceed. In Comparative Example 2 in which the hectorite (clay) was added as the additive, the molten salt dissolved solution was in a suspended state and thus there was a possibility that the additive was adhering to the surfaces of the glass substrates even after the cleaning, resulting in that the glass substrates were unable to be used as they were. Further, variation in inner diameter and variation in strength were also large as compared with the Examples of this invention and thus glass substrates with uniform properties were not obtained.

Example 7

In the chemical strengthening process in Example 1, the chemically strengthened glass substrates were taken out from the molten salt dissolved solution and then a cooling process was carried out to reduce the temperature of the glass substrates. Cooling was first carried out in the air and then the glass substrates were immersed in water for rapid cooling. After the cooling, cleaning was carried out in order to remove adhering matter on the glass substrates. Except for carrying out the cooling process as described above, the chemical strengthening process was carried out in the same manner as in Example 1. Sodium carbonate was used as an additive as in Example 1 and was added in the same addition amount as in Example 1.

In this manner, 1000 magnetic disk glass substrates were manufactured.

Example 8

The chemical strengthening process was carried out in the same manner as in Example 7 except that potassium carbonate (the same addition amount as in Example 7) was used as an additive, thereby manufacturing 1000 magnetic disk glass substrates.

Example 9

The chemical strengthening process was carried out in the same manner as in Example 7 except that sodium sulfate (the same addition amount as in Example 7) was used as an additive, thereby manufacturing 1000 magnetic disk glass substrates.

Example 10

The chemical strengthening process was carried out in the same manner as in Example 7 except that potassium sulfate (the same addition amount as in Example 7) was used as an additive, thereby manufacturing 1000 magnetic disk glass substrates.

With respect to the magnetic disk glass substrates obtained in Examples 7 to 10, variation in strength, variation in inner diameter, and surface adhering matter were evaluated in the same manner as in Example 1 and, further, the surface roughness of main surfaces of the obtained glass substrates was measured by an atomic force microscope (AFM) in the same manner as in Example 1. The results are collectively shown in Table 2 below.

TABLE 2

| | kind of additive | evaluation of variation in strength | evaluation of variation in inner diameter | surface adhering matter | Ra |
|---|---|---|---|---|---|
| Example 7 | sodium carbonate | 100% | 100% | ◎ | 0.12 nm |
| Example 8 | potassium carbonate | 100% | 100% | ◎ | 0.12 nm |
| Example 9 | sodium sulfate | 100% | 100% | ◎ | 0.10 nm |
| Example 10 | potassium sulfate | 100% | 100% | ◎ | 0.10 nm |

From the results shown in Table 2, by adding the sulfate of Na or K as the additive in the molten salt dissolved solution (Example 9, 10), there were obtained the glass substrates with the surfaces of Ra=0.10 nm which was smoother than the surface roughness of the glass substrate surfaces obtained when the carbonate of Na or K was added (Example 7, 8). This is considered to be because, as described before, the glass substrate surfaces became neutral in the cooling or cleaning process after the chemical strengthening so that degradation of the surface roughness did not occur.

What is claimed is:

1. A method of manufacturing an ion-exchanged glass article, comprising:

an ion-exchange step of bringing a glass article with a composition containing Li into contact with a molten salt dissolved solution containing an alkali metal element having an ionic radius larger than an ionic radius of the Li contained in the glass article, thereby ion-exchanging the Li in the glass article with the alkali metal element in the molten salt dissolved solution, wherein at least one kind of additive selected from a group consisting of NaF, KF, $K_3AlF_6$, $Na_2CO_3$, $NaHCO_3$, $K_2CO_3$, $KHCO_3$, $Na_2SO_4$, $K_2SO_4$, $KAl(SO_4)_2$, $Na_3PO_4$, and $K_3PO_4$ is added to the molten salt dissolved solution, the ion-exchange step being carried out by adjusting a temperature of the molten salt dissolved solution so that the additive is contained in a solid state in the molten salt dissolved solution, wherein the additive reacts with Li ions eluted from the glass article into the molten salt dissolved solution to form a solid precipitate so that concentration of the Li ions is lowered in the molten salt dissolved solution, and wherein a melting point of the precipitate is higher than the temperature of the molten salt dissolved solution.

2. The method according to claim 1, wherein the ion exchange is low-temperature ion-exchange.

3. The method according to claim 1, wherein the additive is selected so that even if a precipitate deposited in the molten salt dissolved solution by the ion-exchange step adheres to a surface of the glass article, the precipitate adhering to the surface of the glass article is removed by cleaning the glass article after the ion-exchange step.

4. The method according to claim 1, wherein the additive is selected so that a precipitate deposited in the molten salt dissolved solution by the ion-exchange step has a specific gravity different from a specific gravity of the molten salt dissolved solution.

5. The method according to claim 1, wherein the glass article is a glass substrate for a magnetic disk.

6. The method according to claim 1, wherein a main component of the molten salt dissolved solution is one of $NaNO_3$, $KNO_3$, and a mixed salt of $NaNO_3$ and $KNO_3$.

7. The method according to claim 1, the temperature of the molten salt dissolved solution is 300° C. or more and 500° C. or less.

8. A method of manufacturing an ion-exchanged glass article, comprising:
an ion-exchange step of bringing a glass article with a composition containing Na into contact with a molten salt dissolved solution containing an alkali metal element having an ionic radius larger than an ionic radius of the Na contained in the glass article, thereby ion-exchanging the Na in the glass article with the alkali metal element in the molten salt dissolved solution,
wherein at least one kind of additive selected from a group consisting of $KCl$, $KBr$, $KF$, $K_3AlF_6$, $K_2CO_3$, $KHCO_3$, $K_2SO_4$, $KAl(SO_4)_2$, and $K_3PO_4$ is added to the molten salt dissolved solution, the ion-exchange step being carried out by adjusting a temperature of the molten salt dissolved solution so that the additive is contained in a solid state in the molten salt dissolved solution,
wherein the additive reacts with Na ions eluted from the glass article into the molten salt dissolved solution to form a solid precipitate so that concentration of the Na ions is lowered in the molten salt dissolved solution, and
wherein a melting point of the precipitate is higher than the temperature of the molten salt dissolved solution.

9. The method according to claim 8, wherein the ion exchange is low-temperature ion-exchange.

10. The method according to claim 8, wherein the additive is selected so that even if a precipitate deposited in the molten salt dissolved solution by the ion-exchange step adheres to a surface of the glass article, the precipitate adhering to the surface of the glass article is removed by cleaning the glass article after the ion-exchange step.

11. The method according to claim 8, wherein the additive is selected so that a precipitate deposited in the molten salt dissolved solution by the ion-exchange step has a specific gravity different from a specific gravity of the molten salt dissolved solution.

12. The method according to claim 8, wherein the glass article is a glass substrate for a magnetic disk.

13. The method according to claim 8, wherein a main component of the molten salt dissolved solution is one of $NaNO_3$, $KNO_3$, and a mixed salt of $NaNO_3$ and $KNO_3$.

14. The method according to claim 8, the temperature of the molten salt dissolved solution is 300° C. or more and 500° C. or less.

15. A method of manufacturing an ion-exchanged glass article, comprising:
an ion-exchange step of bringing a glass article with a composition containing Li into contact with a molten salt dissolved solution containing an alkali metal element having an ionic radius larger than an ionic radius of the Li contained in the glass article, thereby ion-exchanging the Li in the glass article with the alkali metal element in the molten salt dissolved solution,
wherein an additive having a melting point higher than a heating temperature of the molten salt dissolved solution is added to the molten salt dissolved solution, the additive being adapted to react with the Li which is eluted from the glass article into the molten salt dissolved solution by the ion-exchange step to thereby precipitate as a solid a compound of the Li in the molten salt dissolved solution, so that the ion-exchange step is carried out while the additive is in a solid state,
wherein the additive reacts with Li ions eluted from the glass article into the molten salt dissolved solution to form a solid precipitate so that concentration of the Li ions is lowered in the molten salt dissolved solution, and
wherein a melting point of the precipitate is higher than the temperature of the molten salt dissolved solution.

16. The method according to claim 15, wherein the additive is a compound containing an alkali metal component.

17. The method according to claim 16, wherein the alkali metal component contained in the additive is the same as the alkali metal element contained in the molten salt dissolved solution.

18. The method according to claim 15, wherein the ion exchange is low-temperature ion-exchange.

19. The method according to claim 15, wherein the additive is selected so that even if a precipitate deposited in the molten salt dissolved solution by the ion-exchange step adheres to a surface of the glass article, the precipitate adhering to the surface of the glass article is removed by cleaning the glass article after the ion-exchange step.

20. The method according to claim 15, wherein the additive is selected so that a precipitate deposited in the molten salt dissolved solution by the ion-exchange step has a specific gravity different from a specific gravity of the molten salt dissolved solution.

21. The method according to claim 15, wherein the glass article is a glass substrate for a magnetic disk.

22. The method according to claim 15, wherein a main component of the molten salt dissolved solution is one of $NaNO_3$, $KNO_3$, and a mixed salt of $NaNO_3$ and $KNO_3$.

23. The method according to claim 15, the temperature of the molten salt dissolved solution is 300° C. or more and 500° C. or less.

\* \* \* \* \*